US006413020B1

(12) United States Patent
Davison

(10) Patent No.: US 6,413,020 B1
(45) Date of Patent: Jul. 2, 2002

(54) VACUUM TRANSFER APPARATUS AND PROCESS

(76) Inventor: Alan L. Davison, 1318 Concord St., Lowell, AK (US) 72745

( * ) Notice: Subject to any disclaimer, the term of this patent is extended or adjusted under 35 U.S.C. 154(b) by 0 days.

(21) Appl. No.: 09/295,382

(22) Filed: Apr. 21, 1999

(51) Int. Cl.$^7$ .............................................. B65G 53/60
(52) U.S. Cl. ......................... 406/168; 406/34; 406/36; 406/145
(58) Field of Search .......................... 406/168, 34, 36, 406/145; 62/459

(56) References Cited

U.S. PATENT DOCUMENTS

| 795,412 A | * | 7/1905 | Olson | |
|---|---|---|---|---|
| 1,937,158 A | * | 11/1933 | Lorentz | |
| 1,965,866 A | * | 7/1934 | Tolman, Jr. | |
| 3,186,768 A | | 6/1965 | Pendleton | 302/3 |
| 3,226,164 A | | 12/1965 | Merrick | |
| 3,386,773 A | | 6/1968 | Ballard, Jr. | 302/28 |
| 3,423,130 A | * | 1/1969 | Milner | |
| 3,431,026 A | | 3/1969 | Russell | 302/27 |
| 3,432,130 A | | 3/1969 | Breedlove et al. | 248/96 |
| 3,620,575 A | | 11/1971 | McIver et al. | 302/53 |
| 3,694,037 A | | 9/1972 | Feder | 302/22 |
| 3,776,600 A | * | 12/1973 | McLeod Jr. | 406/168 |
| 3,861,830 A | * | 1/1975 | Johnson | 417/149 |
| 3,944,118 A | * | 3/1976 | Trill | 222/134 |
| 4,081,110 A | * | 3/1978 | Evans | 406/172 |
| 4,172,535 A | | 10/1979 | Smith | 222/58 |
| 4,238,058 A | * | 12/1980 | Heth | 222/368 |
| 4,341,492 A | * | 7/1982 | Montgomery, Jr. et al | |
| 4,345,858 A | | 8/1982 | Barlow | 406/34 |
| 4,348,872 A | * | 9/1982 | Hill | 62/459 |
| 4,423,987 A | * | 1/1984 | Powers | 406/56 |
| 4,668,131 A | | 5/1987 | Hart, Sr. et al. | 406/23 |
| 4,812,086 A | | 3/1989 | Kopernicky | 406/153 |
| 5,006,018 A | | 4/1991 | Depew | 406/18 |
| 5,037,246 A | * | 8/1991 | Okano et al. | 406/152 |
| 5,064,314 A | * | 11/1991 | Grooms et al. | 406/22 |
| 5,104,232 A | | 4/1992 | Lennox, III | 366/227 |
| 5,221,299 A | * | 6/1993 | Boring | 55/218 |
| 5,354,152 A | * | 10/1994 | Reinhardt | 406/3 |
| 5,487,228 A | * | 1/1996 | Marazzo et al. | 406/151 X |
| 5,603,567 A | | 2/1997 | Peacock | 366/139 |
| 5,669,741 A | | 9/1997 | Ono | 406/79 |
| 5,791,830 A | * | 8/1998 | Fort et al. | 406/151 |
| 6,050,750 A | * | 4/2000 | Aoki | 406/145 |
| 6,089,794 A | * | 7/2000 | Maguire | 406/18 |

* cited by examiner

Primary Examiner—Christopher P. Ellis
Assistant Examiner—Richard Ridley
(74) Attorney, Agent, or Firm—Rader, Fishman & Grauer PLLC; Ronald P. Kananen, Esq.

(57) ABSTRACT

An apparatus for vacuum transferring food product having a hopper for retaining food product, the hopper including a discharge port; a vacuum chamber having an inlet and an outlet, wherein the inlet is coupled to the hopper at the hopper's discharge port; a vacuum source for inducing a vacuum pressure between the hopper and the vacuum chamber so as to cause food product retained by the hopper to be drawn into the vacuum chamber though the inlet; a first timing circuit for controlling the length of time that the vacuum pressure is to be applied between the hopper and the vacuum chamber; and a second timing circuit for controlling the rate at which the food product is dispensed from the outlet. The first timing circuit may be adjusted to increase or decrease the length of time that the vacuum pressure is drawn though the apparatus, and the second timing circuit may be adjusted to increase or decrease the frequency of the opening of the outlet.

18 Claims, 4 Drawing Sheets

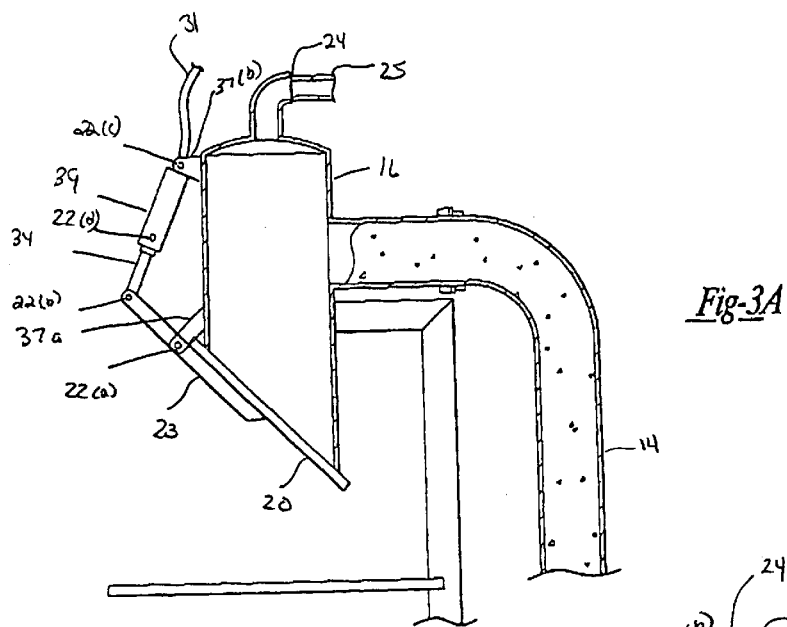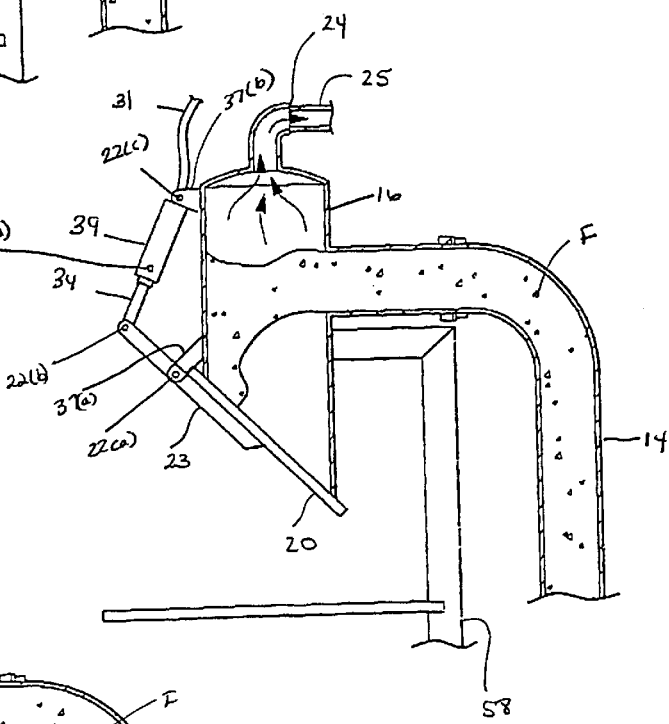

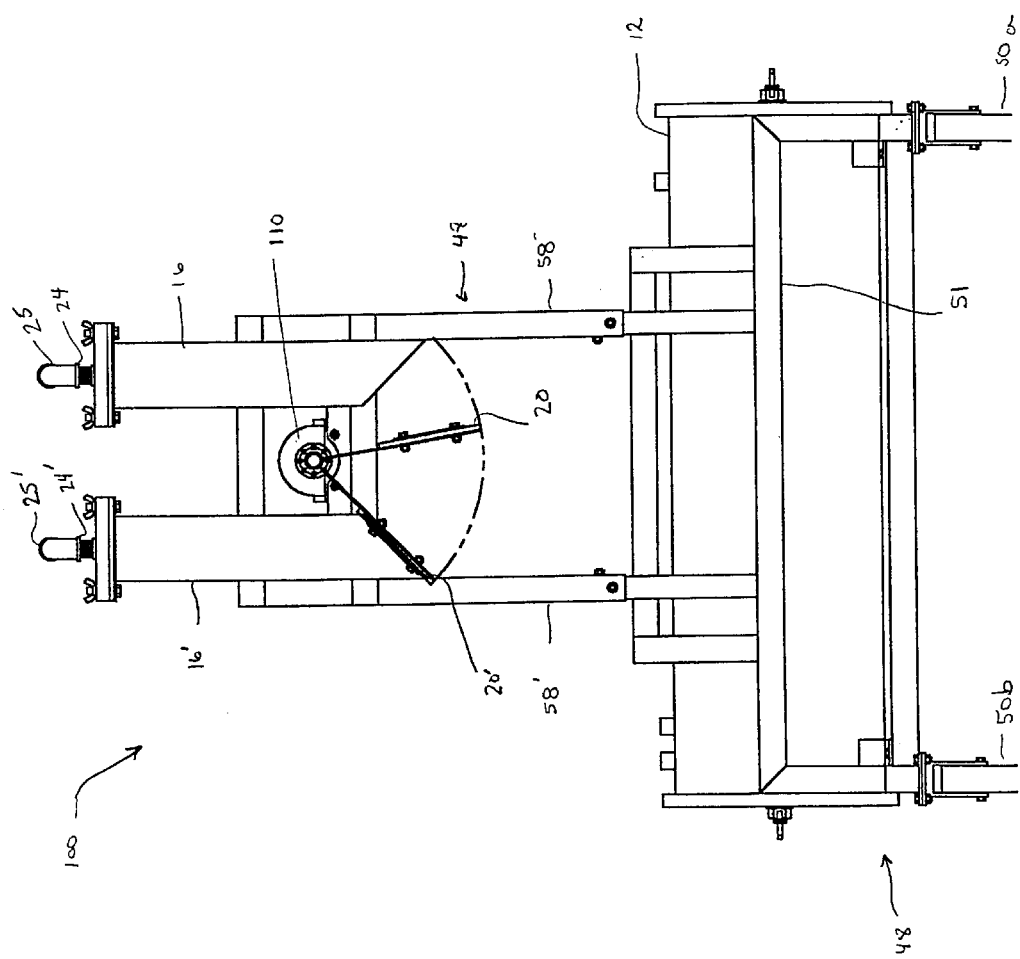

VACUUM TRANSFER APPARATUS AND PROCESS

FIELD OF THE INVENTION

The present invention relates to an apparatus and process for vacuum transferring solid objects. More particularly, the present invention relates to an apparatus and process for transferring food product.

BACKGROUND OF THE INVENTION

In the food processing industry, it is often necessary to transfer food product from one location to another. As processed food products are generally sold by weight, it is desired to maintain the integrity and size of the food product. Often, the food product is prepared with a breading, marinate or other preparation. It is preferable to transfer the food product without substantial damage or loss of the preparation, particularly since the damaged or lost preparation typically cannot be reapplied to the food product.

Conventional food transfer machines include vacuum transferring of finely divided or granular particulate material from one location to another. Other devices employ pneumatic systems for transferring light and medium weight food products. For medium and heavy weight food products, including, but not limited to, fruits, vegetables, chicken filets, fish filets, and shrimp, often conveyor or pumping systems or screw-auger type machines are used to transfer the food product. These systems may damage the food product or damage or cause the product to lose a portion of the preparation. Thus, a device is needed that overcomes these and other disadvantages of the prior art.

SUMMARY OF THE INVENTION

It is an objective of the present invention to provide a vacuum transfer apparatus that does not include any movable or rotating parts that contact the food product during the transfer process.

It is another objective of the present invention to provide a vacuum transfer apparatus, which permits a predetermined quantity of food product to be drawn into a vacuum chamber.

It is still another object of the present invention to provide a vacuum transfer apparatus that dispenses a predetermined quantity of a food product.

A vacuum transfer apparatus designed to transfer light, medium or heavy weight food product from one location to another accomplishes the foregoing and other objectives. The apparatus includes a hopper for retaining the food product, the hopper including a discharge port; at least one vacuum chamber, the vacuum chamber having an inlet and an outlet; a vacuum source for inducing a vacuum pressure in the apparatus so as to draw the food product into the vacuum chamber; and a first timing circuit for controlling the frequency of discharge from the vacuum chamber and the activation of vacuum source.

A second embodiment of the apparatus includes a separate second timing circuit for controlling the rate at which the food product is dispensed from the apparatus.

In order to reduce the likelihood of damage to the food product or any applied preparations, the apparatus contains no moving parts or components that contact the food product during the transfer from the hopper to the vacuum chamber.

The process of vacuum transferring the food product includes the steps of transferring the food product to a hopper; transferring the food product under vacuum pressure from the hopper to a vacuum chamber; and metering out the food product from the vacuum chamber. The food product may be metered out in predetermined quantities. The food product can be transported from the hopper to the vacuum using a flexible hose. Once the food product enters the flexible hose, it will not be exposed to atmospheric conditions until discharged from the vacuum chamber. Thus, the food product is shielded from ambient conditions that may cause the product to lose moisture, and thus become dry and less supple.

The apparatus may include dual vacuum chambers that operate sequentially, e.g., one chamber dispenses the food product from the vacuum chamber while the second vacuum chamber is under vacuum. This dual vacuum chamber apparatus permits an increase in the quantity of food product that may be dispensed from the apparatus during a given cycle. The dual vacuum chamber may also permit a continuous flow of food product to be dispensed from the apparatus. As with the single chamber system, the vacuum and dispensing operations of the dual vacuum chamber apparatus may be time dependent.

BRIEF DESCRIPTION OF THE DRAWINGS

The features and inventive aspects of the present invention will become more apparent upon reading the following detailed description, claims, and drawings, of which the following is a brief description:

FIG. 3a is a partial cross-sectional view of the apparatus shown in FIG. 1, showing the vacuum chamber.

FIG. 3b is a partial cross-sectional view of the apparatus shown in FIG. 1, showing the food product entering the vacuum chamber.

FIG. 3c is a partial cross-sectional view of the apparatus shown in FIG. 1, showing the gate open and the dispensing of the food product from the vacuum chamber.

FIG. 5 shows another embodiment of the apparatus shown in FIG. 1 which includes a second vacuum chamber.

DETAILED DESCRIPTION OF PREFERRED EMBODIMENTS

Figure 1:
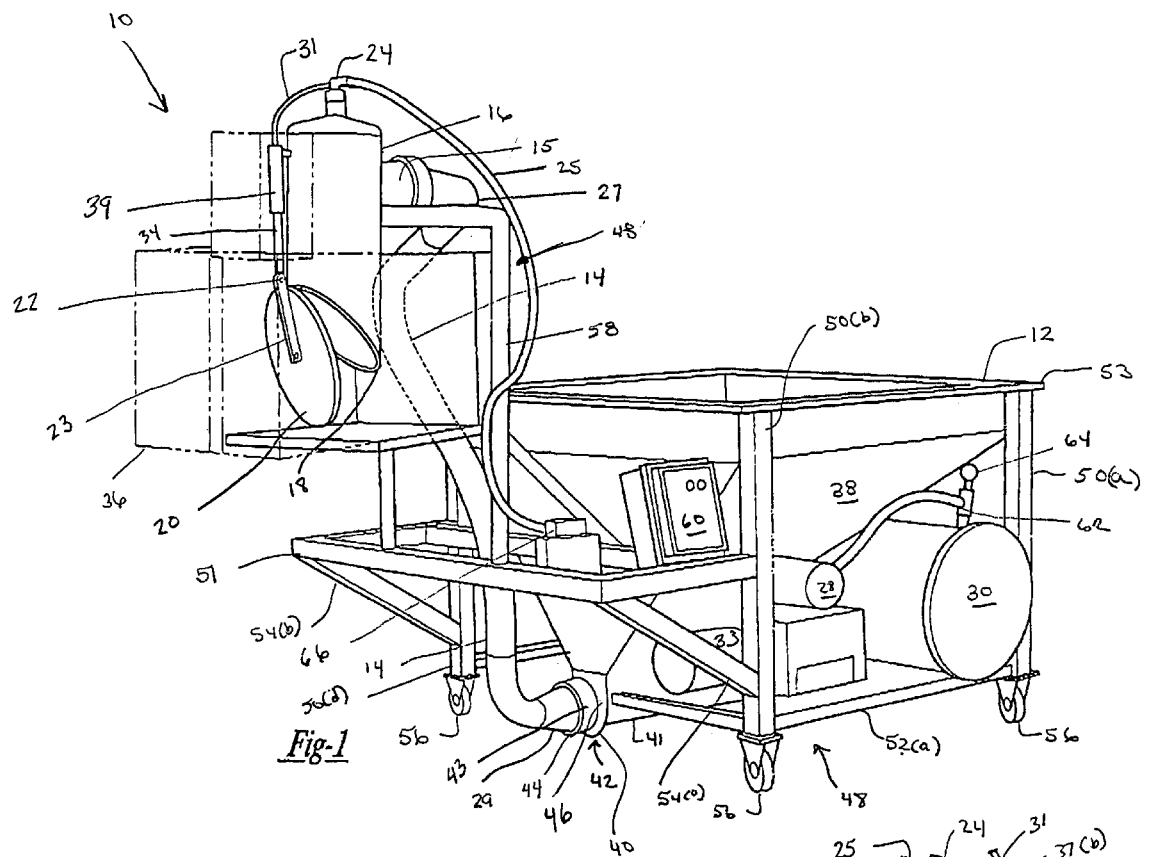
FIG. 1 is a right side perspective view of a vacuum transfer apparatus formed in accordance with the teachings of the present invention.

FIG. 1 shows a vacuum transfer apparatus 10 formed in accordance with the teachings of the present invention. The apparatus 10 includes a hopper 12 coupled to a vacuum chamber 16. The food product (F) is initially received in the hopper 12 and transferred under vacuum to the vacuum chamber 16. The hopper 12 and vacuum chamber 16 are constructed of a durable material. In the preferred embodiment, the hopper 12 and vacuum chamber 16 are constructed of stainless steel. One reason for using stainless steel is that material's corrosion resistant properties, durability and facility for easy cleaning and sanitizing. One of ordinary skill in the art will appreciate that other materials having similar properties may be used.

The hopper 12 includes side walls 38 and a lower hopper 42. The side walls 38 taper inwardly from a large open top surface, forming an upper portion having a funnel-shaped portion. The side walls 38 include a rear wall having a greater slope than the other walls forming the side walls 38. Thus, the rear wall acts as a guide that directs the food product (F) toward the front portion of the hopper 12.

The lower hopper 42 is formed at the front portion of the hopper 12, and includes upwardly extending side walls 40, a rear surface 45 (shown in FIG. 2) and a front surface 46 integrally formed with the side walls 38. However, the side walls 40, the rear surface 45 and the front surface 46 need not be integrally formed with the side walls 38. It will be appreciated that the lower hopper 42 and the side walls 38 may be formed as separate components and coupled together. In the preferred embodiment, the side walls 38 and hopper 42 are welded together, and the lower hopper 42 is closed by an integrally formed bottom surface 41.

The front surface 46 of the lower hopper 42 defines a discharge port 43. The discharge port 43 supports a connector 44 as illustrated in FIG. 1. The connector 44 receives a rigid pipe 29. As will be explained below, when a vacuum pressure is applied to the apparatus 10, the food product (F) moves through the discharge port 43 and into the rigid pipe 29.

A frame 48 supports the hopper 12. In the preferred embodiment, the frame 48 is constructed of stainless steel. It will be appreciated, however, that other materials having similar properties may be used. The frame 48 includes legs 50(a)–(d). The legs 50(a)–(d) support the hopper 12 at each of the four corners 53. Each of the legs 50(a)–(d) may be coupled to the hopper 12 using conventional methods. The opposite end of each leg 50(a)–(d) supports a caster 56 that facilitates movement of the hopper 12.

The legs 50(a)–(d) also support rectangularly shaped shelves 52(a) and 52(b). The lower shelf 52(a) includes a length that extends horizontally between the legs 50(a) and 50(b), and a width that terminates at the side walls 40 of the lower hopper 42. The shelf 52(a) is coupled to the legs 50(a), 50(b) and the frame 48 by conventional means, including welding, clamping, nut/bolt fastening or other suitable means. In the preferred embodiment, welding is used. The shelf 52(b) is located opposite the shelf 52(a) at the leg 50(c). The shelf 52(b) is a rectangularly shaped member having a width that extends horizontally inwardly from the leg 50(c), and a length that terminates at a distance along the frame 48 between the legs 50(c) and 50(d). If necessary, the shelf 52(b) may be terminated at leg 50(d). The shelf 52(b) is coupled to the legs 50(c) and the frame 48 by welding. It will be appreciated that other conventional means may be employed.

The frame 48 also includes an upper frame portion which includes angularly extending brace members 54(a), 54(b). One angular brace member 54(a), 54(b) extends upwardly from each of the legs 50(a) and 50(d), respectively. A rectangularly-shaped frame member 51 extends horizontally between and outwardly from the legs 50(a) and 50(d), and includes a front member which extends horizontally between the angular brace members 54(a), 54(b) to complete the rectangle. The frame 48 also includes a pair of vertically extending members 58 supported by the frame member 51. The vertical members 58 are coupled to the vacuum chamber 16. Thus, this construction structurally joins the vacuum chamber 16 and the hopper 12 together while also providing rigidity and stability to the apparatus 10. It will be appreciated, however, that the hopper 12 and the vacuum chamber 16 need not be interconnected by means of the frame 48. The frame 48 may be constructed such that the hopper 12 is supported by a frame structure separate and independent from that used to support the vacuum chamber 16.

Turning now to a discussion of the vacuum chamber 16, the vacuum chamber 16 includes a cylindrically shaped body surrounding an open center. The cylindrically shaped body includes a lower edge 18 surrounding the bottom portion of the vacuum chamber 16. The lower edge 18 is sealed by a movable gate 20, which forms a vacuum tight seal with the lower edge 18. As shown in FIG. 1, a protective cage 36 may enclose the vacuum chamber 16.

The gate 20 includes an arm 23 having an upper support arm 34. The arm 23 and the support arm 34 permit the gate 20 to move between an open and closed position. The arm 23 is supported by the top surface of the gate 20. The arm 23 may be welded to the top surface of gate 23 or secured thereto using other techniques known in the art. The upper support arm 34 is coupled to the arm 23 at an end opposite the gate 20.

As illustrated in FIGS. 3A–3C, the arm 23 and the support arm 34 are coupled together by a hinge connection 22(b). For added stability, the arm 23 is also coupled to a support arm 37(a) carried by the vacuum chamber 16. In the preferred embodiment, the arm 23 is connected to the support arm 37(a) by a hinge connection 22(a), and the support arm 37(a) is welded to the vacuum chamber 16. Likewise, the support arm 34 is coupled to a support arm 37(b) that is also supported by the vacuum chamber 16. In the preferred embodiment, the support arm 34 is coupled to the support arm 37(b) by a hinge 22(c), and the support arm 34 is welded to the vacuum chamber 16. It will be appreciated that both the arm 23 and the support 34 may be configured without the hinge connections 22(b) and 22(c) or using any suitable construction which permits the gate 20 to pivot between an open and closed position.

Figure 2:
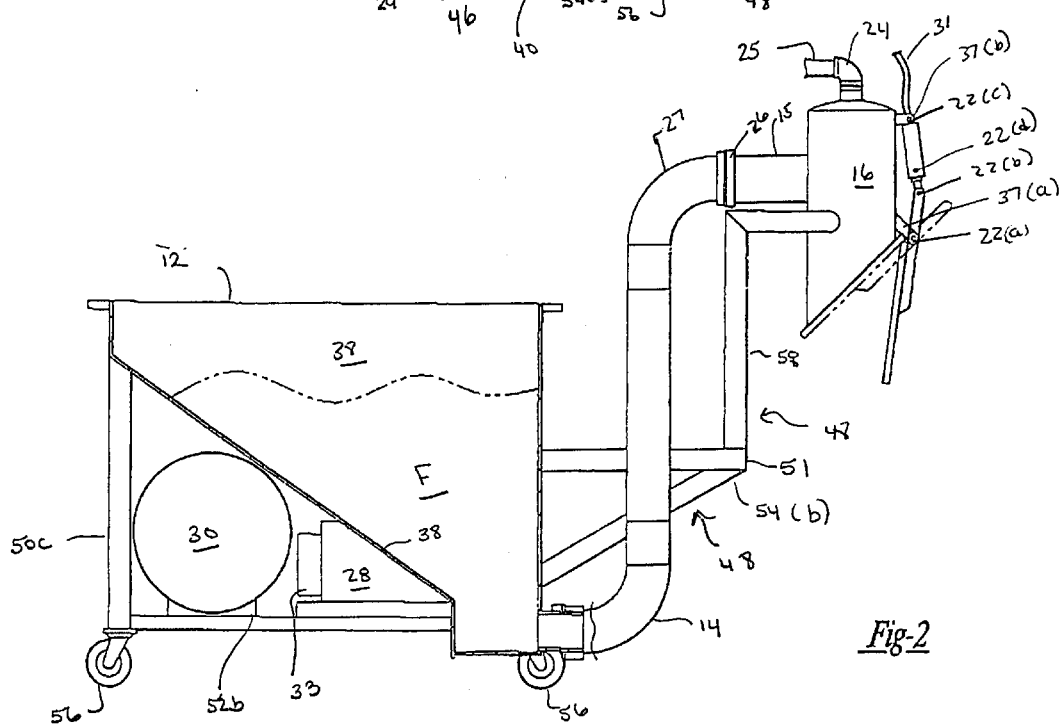
FIG. 2 is a left side elevational view of the apparatus shown in FIG. 1.
Figure 4:
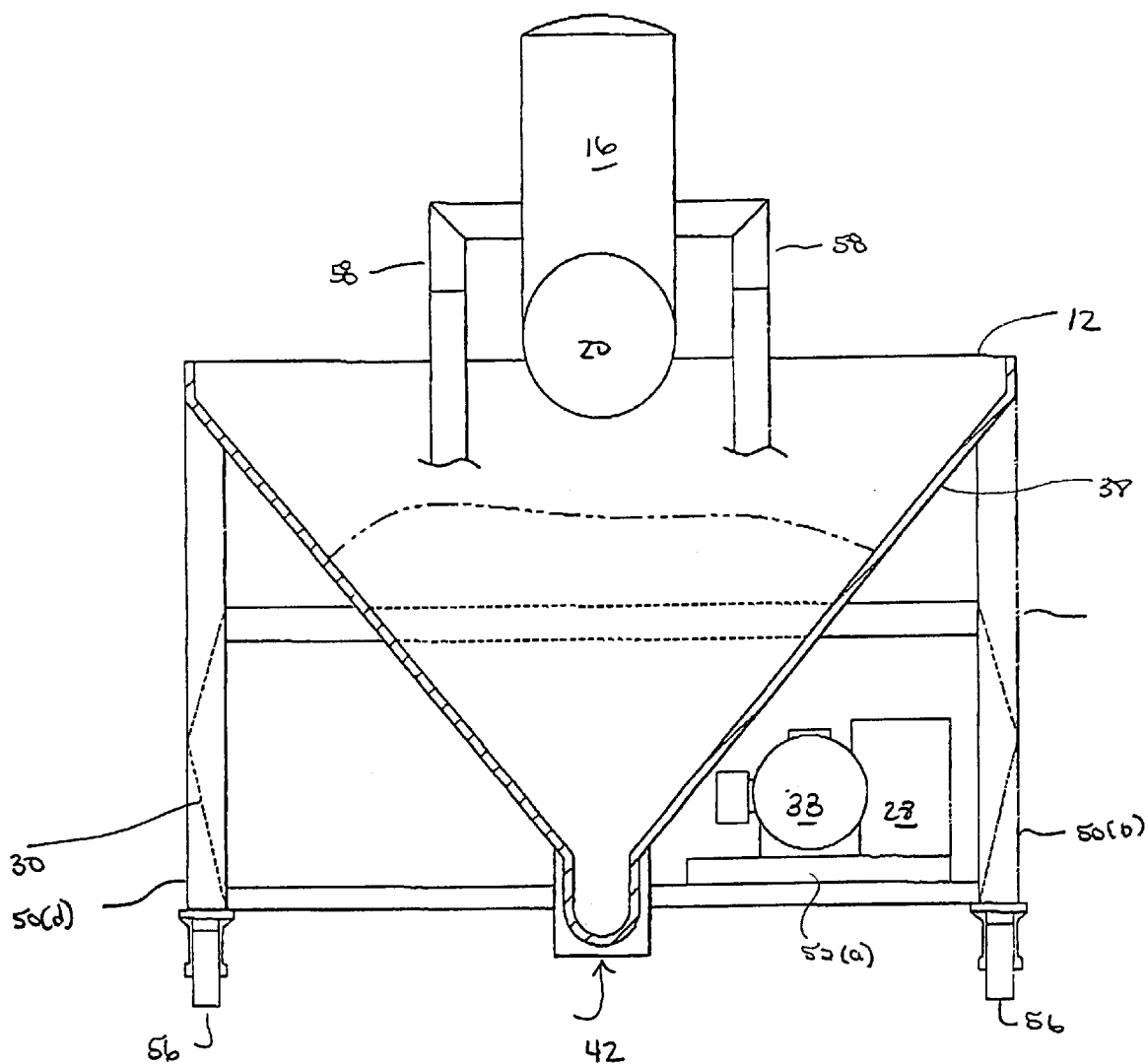
FIG. 4 is a rear cross-sectional view of the apparatus shown in FIG. 1.

The support arm 34 supports housing 39. As shown in FIGS. 2–3C, the housing 39 is coupled to the support arm 34 using a hinge connection 22(d). This arrangement permits movement of the housing 39, as the gate 20 pivots between an open and closed position. The housing 39 receives a pneumatically operated cylinder (not shown) connected to a source of air pressure by line 31 for controlling the operation of the gate 20. It will be appreciated that the operation of the gate 20 can be controlled by any other suitable method, including hydraulically or electrically.

As will be explained below, the operation of the pneumatic cylinder is controlled by a timing circuit (T1). In the preferred embodiment, the timing circuit (T1) is coupled to an air pressure source (not shown) which is coupled to the pneumatic cylinder. When the cylinder receives air under pressure, the cylinder extends, causing the gate 20 to open. When the cylinder is relieved of the air pressure, the cylinder retracts, causing the gate 20 to close.

The vacuum chamber 16 also includes an intake port 15 through which the food product (F) enters the vacuum chamber 16. The inlet 15 supports a connector port 26 that, in turn, receives a rigid pipe 27. The rigid pipe 27 supports the flexible hose 14 that extends between the hopper 12 and the vacuum chamber 16. As will be explained below, the vacuum at the vacuum chamber 16 draws the food product (F) up though the flexible hose 14 and into the vacuum chamber 16 through the intake port 15.

The vacuum pressure system of the apparatus 10 includes a vacuum pump 28, a surge tank 30 and all necessary valves and hoses. It will be appreciated, however, that other suitable sources of vacuum pressure may be used. The vacuum pump 28 is controlled by an electrical drive motor 33, shown in FIGS. 1–2. The electrical motor 33 receives power from conventional electrical sources.

The vacuum pump 28 is coupled to the surge tank 30 using the hose 62. The surge tank 30 is a conventional vacuum storage tank that acts a reservoir for accumulating a vacuum pressure. The surge of vacuum pressure from the surge tank 30 is applied to the line 25, and cooperates with the pump to satisfy the vacuum pressure demands of the apparatus 10. It will be appreciated that the surge tank 30 may be eliminated by increasing the size of the vacuum pump 28.

When the pump 28 is activated, a negative pressure is induced in the line 25 at the vacuum chamber 16 as shown in FIGS. 3B and 3C. Together, the surge tank 30 and the vacuum pump 28 quickly reduce the air pressure in the line 25 to a subatmospheric level, thus causing an initial vacuum surge followed by a continuous vacuum pressure in the line 25. It will be appreciated that the required vacuum pressure and the initial vacuum surge pressure may vary depending on the volume and weight of the food product (F) to be transferred. The pressure level in the line 25, and thus at the vacuum chamber 16, may be monitored using the vacuum pressure gauge 64 shown in FIG. 1.

As shown in FIGS. 3A–C, the vacuum pump 28 induces a vacuum pressure in the vacuum chamber 16 through connector 24 that receives vacuum line 25. The opposite end of the vacuum line 25 is coupled to a flow control valve 66. The preferred embodiment employs a three-way, solenoid controlled flow control valve. The valve 66 may be operated in the closed position, flow-though position or vented to atmosphere. The three-way valve 66 is coupled to the surge tank 30. When the three-way valve 66 is in the flow-though mode, both the surge tank 30 and the vacuum pump 28 create a negative pressure in the line 25. Inserting the valve 66 in the line 25 between the surge tank 30 and the pump 28 reduces the likelihood of drawing any food product (F) into the surge tank 30 or the pump 28.

The apparatus 10 described herein is easy to disassemble and clean. All surfaces of the apparatus 10, including surfaces contacting the food product (F), are readily accessible and reachable using food processing equipment cleaning tools and techniques known in the art. For example, the vacuum chamber 16 is readily accessible, and may be cleaned by simply opening the gate 20 to expose the interior surfaces. Secondly, the flexible hose 14 may be disconnected from both the vacuum chamber 16 and the lower hopper 42 by simply removing the flexible hose 14 from the connectors 44 and 26, thus, exposing the rigid pipes 27 and 46. The rigid pipes 27 and 46 are short enough in length that they may be easily cleaned and disinfected using conventional cleaning tools. Finally, the hopper 12 can be easily cleaned once emptied, as all surfaces are readily accessible.

If the vacuum pump 28, the surge tank 30 or the electric motor 33 require servicing, the components are readily accessible, as they are stored on the shelves 52(a) and 52(b). The shelf 52(a) supports the vacuum pump 28, the vacuum pump 28 electrical drive motor 33, and one end of the surge tank 30. The opposite end of the surge tank 30 is supported by the shelf 52(b).

FIG. 5 shows a second embodiment of the apparatus shown in FIG. 1. The modified apparatus 100 includes dual vacuum chambers 16, 16', and, except as set forth herein, is identical in form and function to the apparatus 10. Further, the vacuum chamber 16' is identical in form and function to the vacuum chamber 16. The vacuum chambers 16, 16' may operate sequentially, e.g., one vacuum chamber 16 dispensing the food product from the vacuum chamber 16, while the second vacuum chamber 16' is under vacuum, receiving food product. Alternatively, the vacuum chambers 16, 16' may be operated simultaneously to increase the quantity of food product (F) dispensed from the apparatus 100.

As illustrated in FIG. 5, the gates 20 and 20' are coupled to a single pivot arm 110. The pivot arm 110 controls the operation of opening and closing each gate 20, 20'. As will be discussed below with respect to apparatus 10, the opening and closing of the gate 20, 20' is regulated by timing circuits T1, T1'. This time dependency permits variability in the rate and quantity of food product dispensed from and/or received by the apparatus 100.

Additionally, the vacuum chamber 16' is connected to a source of vacuum pressure in the manner described herein for the vacuum chamber 16. The length of time that the vacuum is present in the line 25' is controlled by a timing circuit T2', as will be discussed below with regard to apparatus 10. However, it will be appreciated that each vacuum chamber 16, 16' may be coupled to independently operated vacuum pumps and surge tanks, or each coupled to a single pump and surge tank using suitable flow control valves and hoses.

Operation

The operation of the embodiments of the invention disclosed herein shall be described with reference to apparatus 10, as both apparatus 10 and 100 are similarly operated. The operation of the apparatus 10 will be illustrated using marinated chicken filets as the food product (F). Marinated chicken filets may be deposited into the hopper 12 manually or automatically from an automated marinating device. The hopper 12 not only holds the chicken filets in anticipation of the transfer to the vacuum chamber 16, the hopper 12 permits the chicken filets to continue marinating, as the chicken filets and a portion of the marinate sauce are retained by the hopper 12. This storage arrangement may reduce the likelihood that the chicken filets will lose moisture, and thus, dry out from exposure to atmospheric conditions.

As discussed above, when the vacuum pump 28 and the surge tank 30 are energized, a negative pressure is induced in the line 25. This negative pressure results in a vacuum pressure inside the vacuum chamber 16 as long as the gate 20 is closed. The vacuum pressure at the vacuum chamber 16 causes a portion of the chicken filets retained by the hopper 12 and a portion of the marinate sauce to be drawn into the flexible hose 14 as illustrated in FIGS. 3B and 3C.

The time period over which the vacuum pressure will be present in the line 25 and the rate at which the chicken filet is dispensed from the apparatus 10 are controlled by timing circuits T1 and T2. The timing circuits T1 and T2 may be incorporated into the electrical circuitry housed by the control panel 60. Together, the timing circuits T1 and T2 permit the rate and quantity of chicken filets delivered to the processing line to be automatically adjusted to conform to the constraints of the particular operation.

The timing circuit (T2, not shown) controls how long the vacuum will be applied to the vacuum chamber 16 during a given cycle. A single cycle includes the steps of loading of the chicken filets into the vacuum chamber 16, discharging the chicken filets, and a machine idling (dwell) period. The opening and closing of the gate 20 may indicate the end of a single cycle. Once the gate 20 opens and closes, the apparatus 10 will dwell, sit idle for a given period of time. Thereafter, a new cycle will begin.

The quantity of chicken filets drawn into the flexible hose 14 during a given cycle depends upon the length of time that the vacuum pressure is applied to the vacuum chamber 16. Thus, the timing circuit T2 can be adjusted to permit a predetermined amount of chicken filets to be drawn into the hose 14 by controlling how long the vacuum pressure will be applied to the line 25. In the preferred embodiment, the timing circuit (T2) permits the vacuum to be drawn though the line for approximately 4–5 seconds. During this time period, approximately 3–4 pounds of chicken filets are accumulated in the vacuum chamber 16. This feature, thus, provides an improvement over existing systems which do not provide for the automatic transfer of a predetermined amount of a food product (F) from a storage container (hopper 12) over a predetermined time interval.

A timing circuit (T1, not shown) controls the length of time that the gate 20 remains open during a given cycle. As illustrated in FIG. 3B, as long as the gate 20 is closed, the volume of chicken filets accumulating in the vacuum chamber 16 increases. In the preferred embodiment, the gate 20 is programmed to stay open approximately 4–5 second, causing approximately 3–4 pounds of chicken filets to be delivered to the processing line.

The timing circuit T1 may be adjusted to permit an increase or decrease in the volume of chicken filets accumulating inside the vacuum chamber 16. The timing circuit T1 may be programmed to permit the gate 20 to open more or less frequently. Consequently, the timing circuit T1 permits an adjustment in the rate at which the chicken filets may be delivered to the processing line. This metering function provides an improvement over the prior art devices which do not permit a predetermined amount of food product (F) to be automatically transferred from a storage container (hopper 12) over a predetermined interval.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An apparatus for vacuum transferring food product, comprising;
    a hopper for retaining food product, the hopper including a discharge port;
    at least one vacuum chamber having an inlet and an outlet, wherein the inlet is coupled to the discharge port of said hopper, and said outlet of said vacuum chamber including means for metering discharge of said product;
    a vacuum source for inducing a vacuum pressure in the apparatus so as to cause the food product to be drawn into the vacuum chamber from said hopper;
    a first electrical timing circuit for controlling the opening and closing of the vacuum chamber and the activation of the vacuum source, wherein transport of said food product is controlled by said vacuum; and
    a second electrical timing unit for controlling the time duration of the vacuum pressure in said vacuum chamber, whereby metered amounts of said food product may be transported.

2. The apparatus for vacuum transferring food product as defined in claim 1, wherein the first electrical timing circuit controls the vacuum source, and is adjustable to increase or decrease the length of time the vacuum pressure provided to the apparatus thus to propel said food product through the apparatus.

3. The apparatus for vacuum transferring food product as defined by claim 1, wherein a second electrical timing circuit is adjustable to increase the rate of discharge of food product from the apparatus by timing said metering of said output from said apparatus.

4. The apparatus for vacuum transferring food product as defined by claim 1, wherein the vacuum source is a vacuum pump.

5. The apparatus for vacuum transferring food product as defined by claim 3, wherein the vacuum pump is coupled to a surge tank.

6. An apparatus for vacuum transferring food product, comprising:
    a hopper for retaining food product, the hopper including a discharge port;
    at least one vacuum chamber having an inlet and a recloseable outlet, wherein the inlet is coupled to the hopper at the discharge port;
    a vacuum pump for including a vacuum pressure between the hopper and the vacuum chamber so as to cause food product retained by the hopper to be drawn into the vacuum chamber through the inlet;
    means, including a first electrical timing circuit, for controlling the length of time that the vacuum pressure is to be applied between the hopper and the vacuum chamber; and
    means, including a second electrical timing circuit, for controlling the rate at which the food product is dispensed from the outlet.

7. The apparatus for vacuum transferring food product as defined by claim 6, wherein the first and second electrical timing circuits are adjustable to increase or decrease the length of time that the vacuum pressure is drawn through the apparatus.

8. The apparatus for vacuum transferring food product as defined by claim 6, wherein the second electrical timing circuit is adjustable to increase or decrease the rate of the opening and closing of the outlet.

9. The apparatus for vacuum transferring food product as defined by claim 6, wherein the vacuum pump is coupled to a surge tank.

10. The apparatus for vacuum transferring food product as defined by claim 6, wherein the hopper includes front, side and rear walls defining a funnel-shaped upper portion and a lower portion supporting the discharge port, wherein the rear side wall includes a greater slope than the side and front side walls.

11. The apparatus for vacuum transferring food product as defined by claim 6, wherein the apparatus is supported by a frame.

12. The apparatus for vacuum transferring food product as defined by claim 11, wherein the frame is constructed of stainless steel, and included four legs and at least one shelf.

13. The apparatus for vacuum transferring food product as defined by claim 6, wherein the vacuum outlet is closed by a moveable gate that forms a vacuum seal with the vacuum chamber when closed.

14. The apparatus for vacuum transferring food product as defined by claim 13, wherein the movement of the gate is controlled by the second electrical timing circuit.

15. The apparatus for vacuum transferring food product as defined by claim 6, wherein the at least one vacuum chamber is coupled to the vacuum pump.

16. An-apparatus for vacuum transferring food product, comprising:
    a hopper for retaining food product, the hopper including a discharge port;

at least one vacuum chamber having an inlet and a recloseable outlet, wherein the inlet is coupled to the hopper at the discharge port;

a vacuum pump for including a vacuum pressure between the hopper and the vacuum chamber so as to cause food product retained by the hopper to be drawn into the vacuum chamber through the inlet;

a first timing circuit for controlling the length of time that the vacuum pressure is to be applied between the hopper and the vacuum chamber; and a second timing circuit for controlling the rate at which the food product is dispensed from the outlet, wherein the other vacuum chamber is enclosed by a protective cage.

17. The apparatus for vacuum transferring food product as defined by claim 16, wherein the apparatus includes two vacuum chambers.

18. The apparatus for vacuum transferring food product as defined by claim 16, wherein the apparatus is constructed of stainless steel.

* * * * *